UNITED STATES PATENT OFFICE.

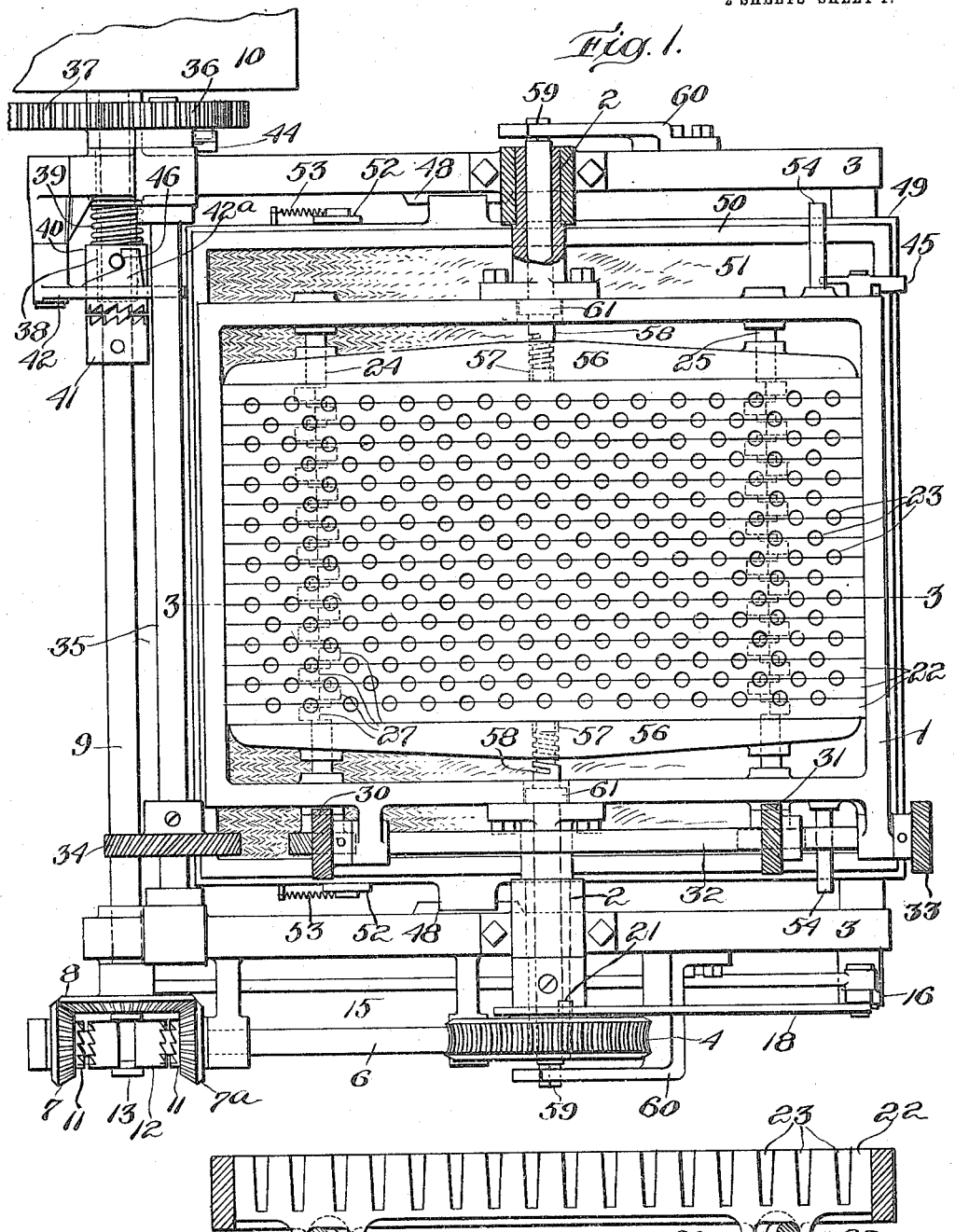

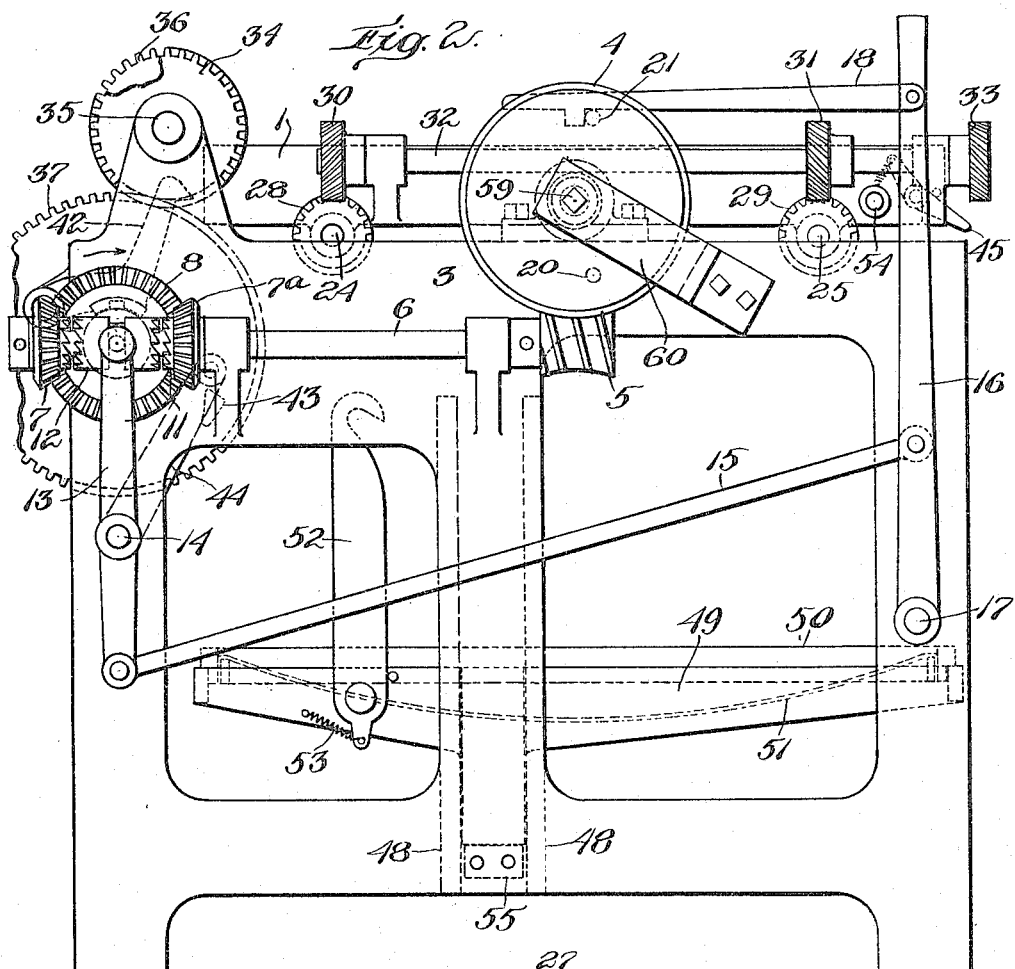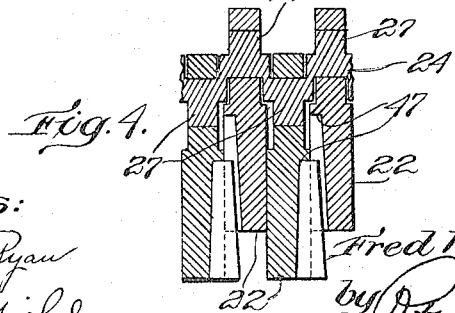

FRED M. BLANCHARD, OF DANVERS, MASSACHUSETTS, ASSIGNOR OF ONE-HALF TO HENRY N. COMEY, OF DANVERS, MASSACHUSETTS.

CRAYON-MAKING MACHINE.

1,123,667.　　　　　Specification of Letters Patent.　　　Patented Jan. 5, 1915.

Application filed August 20, 1912. Serial No. 716,080.

*To al whom it may concern:*

Be it known that I, FRED M. BLANCHARD, a citizen of the United States, and resident of Danvers, in the county of Essex and State of Massachusetts, have invented new and useful Improvements in Crayon-Making Machines, of which the following is a specification.

This invention relates to crayon making machines, and particularly to crayon making machines of the kind having a molding table comprising a series of relatively movable or reciprocating mold sections or mold bars, for discharging the molded crayons when the table is inverted.

The invention has to do principally with the novel and improved mechanism for inverting the molding table, reciprocating the mold sections, and restoring the table to its initial position ready for a new operation.

With my invention it is possible with a single driving shaft, and with a single operation of the controller or shipper, to cause the table to be inverted, or reversed top for bottom and automatically arrested in its inverted position, thereupon automatically to reciprocate the mold sections for a predetermined period to discharge the molded crayons and automatically to stop such reciprocation, and thereupon automatically to restore said table to its initial position in position for a new crayon molding and discharging operation.

A further object of the invention is to provide a crayon-receiver or tray which is automatically raised into close proximity to the molding table when the latter is inverted, so that the fragile crayons will have only a little way to fall when they are discharged from their molds, and is again automatically moved out of the path of the table when the latter is swung back to its initial position.

All of said actions take place automatically and in proper sequence in response to the operation of a single, manually operated controller, and without further attention on the part of the operator.

Other features will hereinafter be more particularly described and pointed out in the claims.

In the accompanying drawings, which illustrate one embodiment of the invention,—Figure 1 is a plan view of a crayon molding machine containing my invention; Fig. 2 is a side elevation of the machine shown in Fig. 1; Fig. 3 is a partial section on line 3—3 of Fig. 1, showing one of the mold sections in side elevation; and Fig. 4 is an enlarged detail showing some of the mold bars in cross section in one of their positions hereinafter described.

The machine is made with a mold table comprising a rectangular frame 1, provided with hollow trunnions 2, 2 journaled in bearings on the machine frame 3. One of the trunnions 2 has a worm gear 4 fixed to its end and meshing with a worm 5 fast on shaft 6, which is journaled in suitable bearings on frame 3. Loosely mounted on shaft 6 is a pair of bevel pinions 7 and 7ª, which mesh with bevel gear 8, fixed to the main driving shaft 9 of the machine. Driving shaft 9 carries a pulley 10 by which the machine is driven from some suitable source of power.

Pinions 7 and 7ª are made with clutch members 11, 11, which coöperate with a shifting clutch member 12 splined on shaft 6.

Clutch member 12 is engaged and actuated by a shipper lever 13 fast on a rock shaft 14, which is journaled on frame 3. Said shipper lever is also connected by a link 15 with an operating lever or controller 16, fulcrumed at 17 on the machine frame 3.

At the upper end of the operating lever 16 is pivoted one end of a bar 18, whose opposite end is provided with a shoulder projecting in the path of two pins or studs 20 and 21 which extend laterally from the sides of worm gear 4.

The rectangular frame 1 of the mold table incloses a series of mold sections or mold bars 22, whose abutting faces are formed with mold recesses 23, the recesses 23 of each mold section registering with similar recesses of the adjacent section or sections to form complete crayon-molding holes, preferably of tapering form as shown.

Two crank shafts or cam shafts 24 and 25 are journaled in frame 1 of the mold table and extend respectively through slots 26, 26, (Fig. 3) provided in each mold section 22. Shafts 24 and 25 are each made with a plurality of cranks or cams, 27, one for each slot 26, which cams are staggered as indicated in Fig. 1 so that when the two shafts 24 and 25 are rotated in unison, as hereinafter described, the mold sections will be reciprocated vertically with relation to one another, one set consisting of alternate sections moving upward, and the other set of alternate sections moving downward. Shafts 24 and 25 carry respectively, spiral gears 28 and 29, which are driven by spiral gears 30 and 31, fast on shaft 32, journaled in bearings on the molding table frame 1.

At one end of shaft 32 is fastened a spiral gear 33 which coöperates with a spiral gear 34, fixed to shaft 35, in the manner presently to be described.

Shaft 35 is journaled in bearings on frame 3, and also carries a spur pinion 36, which meshes with a gear 37 mounted on driving shaft 9. The hub of gear 37 is loose on shaft 9 and is elongated as indicated by dotted lines at 38, so as to extend through frame 3, and to receive upon it a spring 39 and clutch member 40, the latter being splined to said hub.

Clutch member 40 coöperates with a clutch member 41 fixed to driving shaft 9, but is normally held out of engagement with clutch member 41 by a stop latch 42 having a lug 42ª engaging a stud 46 on clutch member 40.

The gear 37 is provided on one side with a cam 43, which coöperates with a roller cam-follower at the free end of an arm 44 fixed to rock shaft 14.

After the operator has poured the crayon fluid into the recesses 23 and allowed the fluid to "set," in the usual way, the machine being in the position shown in Figs. 1 and 2 of the drawings, he throws the operating lever 16 to the right as viewed in Fig. 2, thereby shifting clutch 12 into engagement with pinion 7ª and connecting pinion 7ª with shaft 6. The shaft 9, which is continuously driven by pulley 10, will thereupon rotate shaft 6, through bevel gear 8 and pinion 7ª, turning worm 5, and thereby rotating gear 4. The rotation of gear 4, which is fast on one of the trunnions of the mold table, will swing or rotate the mold table on its trunnions in a clockwise direction as viewed in Fig. 2, reversing it top for bottom. At the completion of a half revolution of gear 4 and table 1, the pin 20 on gear 4 will engage the lug at the end of bar 18, and act through bar 18 to shift lever 16 back to its initial or neutral position, thus again disconnecting pinion 7ª from shaft 6, and arresting the tendency of gear 4 and table 1 to rotate farther in that direction.

Near the end of this half rotation of the mold table 1, the spiral gear 33 on the end of shaft 32 is brought into mesh with spiral gear 34 on shaft 35; and at approximately the same time, a latch or pawl 45, pivotally mounted on table frame 1, engages and operates latch 42, momentarily lifting the same and thus disengaging the detent 42ª, carried by latch 42, from the stud or pin 46. Thereupon spring 39 shifts clutch member 40 into engagement with clutch member 41, and gear 37 makes one complete revolution with shaft 9. At the end of this revolution of gear 37, the stud 46 against engages the detent 42ª of stop latch 42, which will have dropped back to normal position, having been lifted only momentarily by pawl 45, and as the stud 46 rides up the incline of detent 42ª, it disconnects gear 37 and shaft 9, by disconnecting clutch members 40 and 41, thus stopping further rotation of said gear 37. The gear 37, when thus rotated, acts through gear 36, shaft 35, gears 34 and 33, shaft 32, and gears 28, 29, 30 and 31, to impart a number of revolutions to crank shafts 24 and 25, thereby reciprocating their inverted mold sections 22, and disengaging and discharging the molded crayons. The reciprocating movement of the mold sections alternately disengages each crayon first from one side of its mold and then from the other side, as will be clear by reference to Fig. 4. When thus loosened the crayons will drop out of their molds by gravity. When gear 37 completes the one revolution described, the cam 43 will engage the cam follower on the end of arm 44, actuating arm 44 to rotate the rock shaft 14, and swing shipper 13 to the left as viewed in Fig. 2, thereby engaging clutch member 12 with pinion 7 and consequently connecting shaft 6 with driving shaft 9 through pinion 7. This causes worm 5 to rotate gear 4 and table 1 in the opposite direction, that is, counter-clockwise, to the extent of a half revolution. At the end of such half revolution pin 21 on gear 4 engages the shoulder on bar 18, and swings bar 18, lever 16, link 15, and shipper 13 in the direction to restore clutch member 12 to its neutral position, out of engagement with either pinion 7 or 7ª. Thus, the single operation of the lever 16, causes the table to reverse, the mold sections to reciprocate in inverted position to discharge the crayons, and the table to swing back again to normal position, all automatically and in proper sequence.

Mounted in vertical ways 48 on frame 3 is a tray support 49, on which is removably mounted a tray 50, made with a bottom 51 of cloth or other soft material to receive the fragile crayons. The tray support 49 has two hooks 52, pivoted to it one at each side, and provided with springs 53, which normally press the upper ends of the hooks into the paths of two studs 54 projecting from table 1. During the movement of table 1, while it is being shifted from its normal to its inverted position, the studs 54, engage the hooks 52 and lift the support 49 and tray 50 close up under table 1, so that the frail and easily broken crayons will have only a short distance to fall, and a soft receiver to fall into, when they are discharged from the molds. When table 1 swings back to its normal position the support 49 is lowered again until arrested by stop 55 in the slideways 48, and studs 54 on the table disengage from hooks 52. The tray may then readily be removed from the machine to receive the crayons discharged at the next operation of the machine.

In order that the mold sections 22 may be pressed tightly together while receiving the crayon fluid, and be automatically relieved of pressure and somewhat loosened, to permit the reciprocation of the mold sections when the crayons are being discharged, I provide a pair of clamp bars 56, one at each side of the set of mold bars, mounted to slide on crank shafts 24 and 25. Each clamp bar 56 is made with a threaded bore 57 into which extends a screw 58, projecting through the corresponding trunnion 2 which is made hollow. One of said screws is a right handed screw and one a left handed screw. Each screw 58 is provided on its outer end with a square or rectangular portion 59, engaged by a socket in bracket 60 to prevent rotation of said screws. When table 1 is reversed from its normal position to its inverted position, the rotation of clamp bars 56 relatively to screws 58, moves said bars apart and automatically loosens the mold sections 22 so that they are free to be reciprocated; and when the table is swung back again to its normal position, said screws again automatically move the bars toward each other, and the latter firmly clamp the mold sections together. Flanges 61 on screws 58 serve as stops to prevent outward endwise movement of said screws.

I claim:

1. In a crayon molding machine, a molding table comprising a series of abutting mold sections adapted to be reciprocated relatively to one another in a direction parallel to their abutting faces, said molding table and mold sections being adapted to be bodily and simultaneously inverted as a single part, means to impart a relatively reciprocating movement simultaneously to the whole series of mold sections, such reciprocating means being inactive except when the molding table is in inverted position, a continuously rotating driving shaft, and mechanism for actuating said reciprocating means, normally disconnected from said driving shaft and automatically connected to said driving shaft to reciprocate the mold sections when the molding table is brought to its inverted position.

2. In a crayon molding machine, a molding table comprising a series of abutting mold sections adapted to be reciprocated relatively to one another in a direction parallel to their abutting faces, said molding table and mold sections being adapted to be bodily and simultaneously inverted as a single part, means to impart a relatively reciprocating movement simultaneously to the whole series of mold sections, such reciprocating means being inactive except when the molding table is in inverted position, actuating mechanism adapted automatically to actuate said reciprocating means when the molding table is brought to its inverted position, and mechanism automatically actuated after said reciprocating movement of the mold sections, to restore said molding table and mold sections to their initial position.

3. In a crayon molding machine, a molding table adapted to be inverted, comprising a series of relatively movable mold sections, a normally inoperative cam shaft to reciprocate said sections relatively to one another, a continuously rotating driving shaft, and mechanism for rotating said cam shaft, normally disconnected from said driving shaft and automatically connected to said driving shaft to reciprocate the mold sections when the molding table is brought to its inverted position.

4. In a crayon molding machine, a molding table adapted to be inverted, comprising a series of relatively movable mold sections, a normally inoperative cam shaft to reciprocate said sections relatively to one another, and normally disconnected gears through which said cam shaft is driven, said gears adapted automatically to come into engagement to operate said cam shaft when the molding table is inverted.

5. In a crayon molding machine, a molding table adapted to be inverted, comprising a series of relatively movable mold bars, a normally inoperative cam shaft to reciprocate said mold bars relatively to one another, a mold bar actuating-shaft carried by said table and extending transversely of said cam shaft, adapted to rotate said cam shaft, a gear on said mold bar acuating-shaft, and a driving gear adapted to mesh with said gear on the actuating-shaft when the table is inverted.

6. In a crayon molding machine, a molding table comprising a series of abutting mold sections adapted to be reciprocated relatively to one another, said molding table and mold sections being adapted to be bodily and simultaneously inverted as a single part, mechanism to invert said table and mold sections, a controller for setting said mechanism in action, and mechanism which is normally inactive until the table reaches its inverted position adapted when the table reaches its inverted position automatically to be brought into action to reciprocate said relatively movable mold sections.

7. In a crayon molding machine, a molding table comprising a series of abutting mold sections adapted to be reciprocated relatively to one another, said molding table and mold sections being adapted to be bodily and simultaneously inverted as a single part, mechanism to invert said table and mold sections, a controller for setting said mechanism in action, mechanism which is normally inactive until the table reaches its inverted position adapted when the table reaches its inverted position automatically to be brought into action to reciprocate said relatively movable mold sections, and mechanism adapted automatically to restore said table and mold sections to their initial position after such reciprocating action of the mold sections.

8. In a crayon molding machine, a molding table adapted to be inverted, comprising a series of relatively movable mold sections, a driving shaft, normally disconnected table inverting mechanism, normally disconnected mold reciprocating mechanism, a controller for connecting said table inverting mechanism with said driving shaft, and means adapted automatically to disconnect said table inverting mechanism from said driving shaft and to connect said mold reciprocating mechanism with said driving shaft, when the table has been inverted.

9. In a crayon molding machine, a molding table adapted to be inverted, comprising a series of relatively movable mold sections, a driving shaft, normally disconnected table inverting mechanism, normally disconnected mold reciprocating mechanism, a controller for connecting said table inverting mechanism with said driving shaft, means adapted automatically to disconnect said table inverting mechanism from said driving shaft and to connect said mold reciprocating mechanism with said driving shaft, when the table has been inverted, and means automatically to reconnect said table inverting mechanism with the driving shaft and restore the table to its initial position after the reciprocating action of the mold sections.

10. In a crayon molding machine, a molding table adapted to be inverted, comprising a series of relatively movable mold sections, a driving shaft, normally disconnected table inverting mechanism, normally disconnected mold reciprocating mechanism, a controller for connecting said table inverting mechanism with said driving shaft, means adapted automatically to disconnect said table inverting mechanism from said driving shaft and to connect said mold reciprocating mechanism with said driving shaft, when the table has been inverted, means automatically to reconnect said table inverting mechanism with the driving shaft and restore the table to its initial position after the reciprocating action of the mold sections, and means automatically to loosen said mold sections when the table is inverted, and again to tighten them when the table is restored to its initial position.

11. In a crayon molding machine, a molding table comprising a series of abutting mold sections adapted to be reciprocated relatively to one another, said molding table and mold sections being adaped to be bodily and simultaneously inverted as a single part, normally inoperative means to reciprocate said mold sections relatively to one another, actuating mechanism adapted automatically to actuate said normally inoperative reciprocating means when said table and mold sections are in inverted position, and mechanism adapted automatically to stop said reciprocating means at a predetermined time.

12. In a crayon molding machine, a molding table adapted to be inverted, comprising a series of relatively movable mold sections, means to invert said table and to reciprocate said mold sections when in inverted position, a crayon receiver below said table and normally out of its path while the table is being inverted, and means automatically actuated by the same mechanism which inverts the table to elevate said crayon receiver into close proximity to the table when the table is brought to inverted position.

13. In a crayon molding machine, a molding table adapted to be inverted, comprising a series of relatively movable mold sections, means to invert said table and to reciprocate said mold sections when in inverted position, a crayon receiver below said table and normally out of its path while the table is being inverted, vertically arranged slideways for guiding said crayon receiver up and down, and means automatically to elevate said crayon receiver into close proximity to the table when the table is brought to inverted position, and to lower said crayon receiver to its normal position when the table is restored to its initial position.

14. In a crayon molding machine, a molding table adapted to be inverted, comprising a series of relatively movable mold sections, means to invert said table and to reciprocate said mold sections when in inverted position, a crayon receiver below said table and normally out of its path while the table is being inverted, and means automatically to couple said table during its inverting movement with said crayon receiver, whereby said table will lift said crayon receiver into close proximity to itself when inverted, and automatically to lower and uncouple said crayon receiver from said table during its return movement.

15. In a crayon molding machine, a molding table adapted to be inverted, comprising a series of relatively movable mold sections, means to invert said table and to reciprocate said mold sections when in inverted position, a crayon receiver below said table and normally out of its path while the table is being inverted, a supporting frame for said crayon receiver, and hooks connected to said supporting frame and projecting into the path of said table, adapted to be engaged by said table during its inverting movement and to lift said supporting frame and crayon receiver into close proximity to the table when inverted, and to disengage from said table during its return movement.

Signed by me at Boston, Massachusetts, this 16th day of August, 1912.

FRED M. BLANCHARD.

Witnesses:
HENRY N. COMEY,
ROBERT CUSHMAN.

Copies of this patent may be obtained for five cents each, by addressing the "Commissioner of Patents, Washington, D. C."